United States Patent
Baranczyk et al.

(10) Patent No.: US 10,133,779 B2
(45) Date of Patent: Nov. 20, 2018

(54) QUERY HINT MANAGEMENT FOR A DATABASE MANAGEMENT SYSTEM

(71) Applicant: International Business Machines Corporation, Armonk, NY (US)

(72) Inventors: Shawn J. Baranczyk, Rochester, MN (US); Rafal P. Konik, Oronoco, MN (US); Roger A. Mittelstadt, Byron, MN (US); Brian R. Muras, Otsego, MN (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 14/986,696

(22) Filed: Jan. 3, 2016

(65) Prior Publication Data

US 2017/0132284 A1    May 11, 2017

Related U.S. Application Data

(63) Continuation of application No. 14/935,896, filed on Nov. 9, 2015.

(51) Int. Cl.
*G06F 17/30* (2006.01)
(52) U.S. Cl.
CPC .... *G06F 17/30469* (2013.01); *G06F 17/3051* (2013.01); *G06F 17/30466* (2013.01)
(58) Field of Classification Search
CPC .............................................. G06F 17/30463
See application file for complete search history.

(56) References Cited

U.S. PATENT DOCUMENTS

| | | | |
|---|---|---|---|
| 7,634,456 B2 | 12/2009 | Yagoub et al. | |
| 7,640,230 B2 | 12/2009 | Hanson et al. | |
| 8,161,038 B2 | 4/2012 | Shen et al. | |
| 8,335,767 B2 | 12/2012 | Das et al. | |
| 8,381,213 B1 | 2/2013 | Naamad et al. | |
| 8,805,852 B2 | 8/2014 | Gopal et al. | |
| 2005/0120000 A1* | 6/2005 | Ziauddin | G06F 17/30306 |
| 2006/0212264 A1* | 9/2006 | Barsness | G06F 17/30336 |
| | | | 702/182 |
| 2008/0313134 A1* | 12/2008 | Lei | G06F 17/30442 |

OTHER PUBLICATIONS

Colgan, Maria, "SQL Plan Management with Oracle Database 12c," Oracle White Paper <www.oracle.com/technetwork/database/bi-datawarehousing/twp-sql-plan-mgmt-12c-1963237.pdf >.
Ziauddin, Mohamed, et al., "Optimizer Plan Change Management: Improved Stability and Performance in Oracle 11g," Proceedings of the VLDB Endowment 1, No. 2, 2008, pp. 1346-1355.
Baranczyk et al., "Query Hint Management for a Database Management System", U.S. Appl. No. 14/935,896, filed Nov. 9, 2015.
List of IBM Patents or Patent Applications Treated as Related.

* cited by examiner

*Primary Examiner* — Hung Q Pham
(74) *Attorney, Agent, or Firm* — David B. Woycechowsky

(57) ABSTRACT

Disclosed aspects relate to query hint management for a database management system. With respect to a hint for a query, a set of hint profile data is established. The database management system detects a triggering event. Based on the set of hint profile data, the database management system determines to perform a hint action in response to the triggering event. Performance of the hint action is initiated.

1 Claim, 6 Drawing Sheets

QUERY HINT MANAGEMENT FOR A DATABASE MANAGEMENT SYSTEM

BACKGROUND

This disclosure relates generally to database management systems and, more particularly, relates to query hints. Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure relate to hint life-cycle management, a set of hint profile data, and usage of the set of hint profile data. The set of hint profile data can be used to monitor for hints that are not valid, outdated, obsolete, or deprecated. The hint may be updated to reflect updated status or information. The set of hint profile data may include statistics such as original estimate with and without the hint, and original run-time with and without the hint. Aspects of the disclosure can notify a user/administrator when the hint is expired, update the hint automatically without manual intervention, or indicate when a hint may no longer be valid due to data or code changes.

Disclosed aspects relate to query hint management for a database management system. With respect to a hint for a query, a set of hint profile data is established. The database management system detects a triggering event. Based on the set of hint profile data, the database management system determines to perform a hint action in response to the triggering event. Performance of the hint action is initiated.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
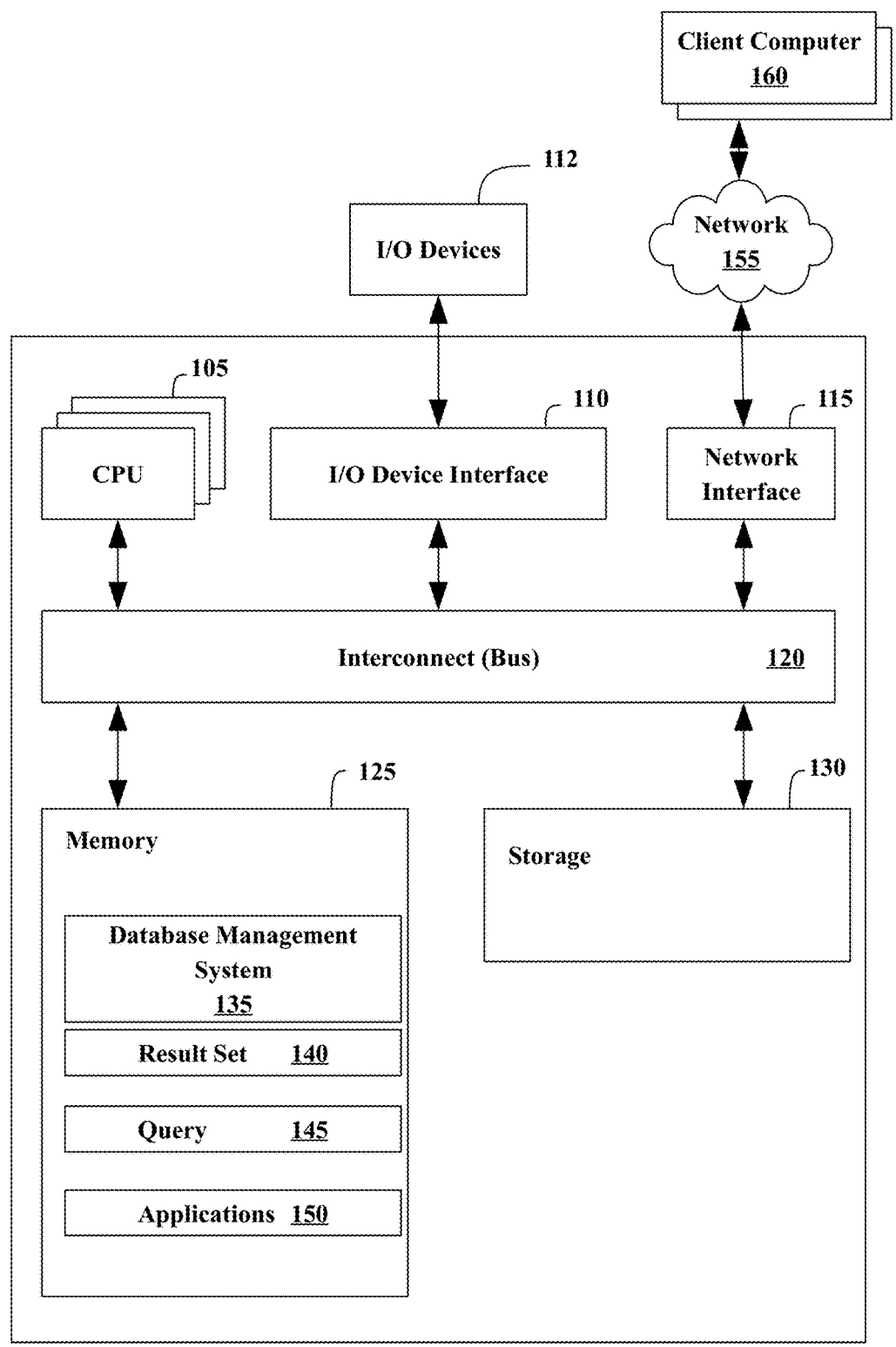
FIG. 1 illustrates an example representation of a computer system connected to a client computer via a network according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to hint life-cycle management, a set of hint profile data (e.g., hint meta-data), and usage of the set of hint profile data. The set of hint profile data can be used to monitor for hints that are not valid, outdated, obsolete, or deprecated. The hint itself, which may be embedded as part of the Structured Query Language (SQL) which is further embedded in an application, may be updated to reflect updated status or information. Meta-data related to a query may include users who added the hint, most frequent users of query, release level/fix-level, temporal identifiers for additions/deletions, etc. Meta-data related to a query may include original optimization statistics such as original estimate with and without the hint, and original run-time with and without the hint. Aspects of the disclosure can notify a user/administrator when the hint is expired, update the hint (e.g., beyond circumventing the hint) automatically without manual intervention, or indicate when a hint may no longer be valid due to data or code changes.

SQL hints may be used for performance/functionality reasons to override optimization decisions that the database optimizer would normally make. For example, a database administrator or application designer may have integral information about the database or application that can allow them to select a specific index which is more efficient than the index picked by the optimizer for specific kinds of queries. The hint can force the selected index (or other plan choices) for those queries.

Query hints may be ubiquitous in database environments, including many hints across many queries. As such, the system may be cluttered (e.g., effectively littered) with many hints. Thus, aspects described herein may be beneficial to help manage and control what may be termed hint-creep (e.g., the continual addition of hints overtime while losing the history or the reason for the hint).

For example, a user may utilize a new application which runs a query that chooses one index, but the user knows the data in their database including knowing that a different index would run more efficiently. By adding a hint to the query, the user is able to force the index of their choice and continue their application roll-out plans efficiently. Over time, the database may grow until the hint forces a bad query plan for the new data in the database tables. The user may investigate until determining that a hint is forcing a bad query plan, but the rationale for having the hint or who added the hint may be unknown. Without aspects described herein, the user may end-up spending valuable time and resources to further investigate various features associated with the hint.

Aspects of the disclosure include a method, system, and computer program product of query hint management for a database management system. With respect to a hint for a query, a set of hint profile data is established. The database management system detects a triggering event. Based on the set of hint profile data, the database management system determines to perform a hint action in response to the triggering event. Subsequently, performance of the hint action is initiated.

The hint may include a table scan, an index selection, an index criteria, a join order, a join criteria, a statistic, a grouping criteria, a sorting criteria, a parallelism criteria, a fix-level criteria, a database code level, an optimization goal, a fair memory share, live data, a processing intensive goal, a parameter marker implementation, or a materialization goal. In embodiments, the set of hint profile data with respect to the hint for the query includes a set of historical information, a set of usage information, a set of performance information, a set of user information, a set of temporal information, a set of computing context information, or a set of event information. The triggering event can include achieving a temporal criterion, achieving a usage criterion, achieving a performance criterion, achieving a user criterion, achieving a computing context criterion, or achieving an event criterion. In embodiments, the hint action includes removing the hint, modifying the hint, analyzing the hint, flagging the hint, or notifying a user.

Using query hint management, aspects of the disclosure may provide performance or efficiency benefits (e.g., speed, flexibility, responsiveness, resource usage, productivity). The optimizer of a database management system may benefit from life-cycle management of the hint(s) without requiring manual intervention. Administrators/users of the database management system can use their time on matters other than managing hints (e.g., rather than sifting through large data stores of past queries/hints). Aspects may save resources such as bandwidth, processing, or memory.

For example, the below underlined text may be an example set of hint profile data.

A user may provide the following (e.g., query/hint):
SELECT e.last_name,d.department_name
/*+ PARALLEL(employees 3)
--user=fred
--system=SYS1
--Date=07/15/2010*/
FROM employees e, departments d
WHERE e.department_id=d.department_id;

The database management system may intercept it and change to following:
SELECT e.last_name,d.department_name
/*+DB2 Disabled PARALLEL(employees 3)
--user=db2
--system=SYS1
--Date=07/15/2015*/
FROM employees e, departments d
WHERE e.department_id=d.department_id;

In various embodiments, events that may cause a query optimizer to automatically evaluate hints include a release change, a change to the program, a change in query performance beyond a threshold, a change to the environment, or a requested optimization plan change by database optimizer. The hint may have a specified end or expiration (e.g., end date, release upgrade, new plan change, hardware upgrade, threshold number of times query is run). Aspects may be performance-specific, and can include errors that a hint can avoid such as a functional errors. A query plan change may be detected, and multiple query plans may run in the background. If one of the background query plans has a benefit value exceeding a query plan using the hint, then the query plan using the hint may be disabled and the set of hint profile data can be updated.

One or more reports can be produced (e.g., at the end of the month certain hints will expire and the optimizer can recommend removal/keeping of hints for future). The hint may be honored in one environment but not another (e.g., batch versus interactive); for instance, the hint may be applied to ALLIO (all rows as fast as possible) versus FirstIO (first page of rows as fast as possible). A history of hint updates can be logged in the set of hint profile data. A user/administrator may initiate the reevaluation of the hints at any time. The set of hint profile data can be stored in the SQL comments, in one or more system catalog tables, or in a data structure on the system. An outdated hint may be completely removed from the SQL; the history or set of hint profile data associated with the removed hint may be stored elsewhere in the system.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
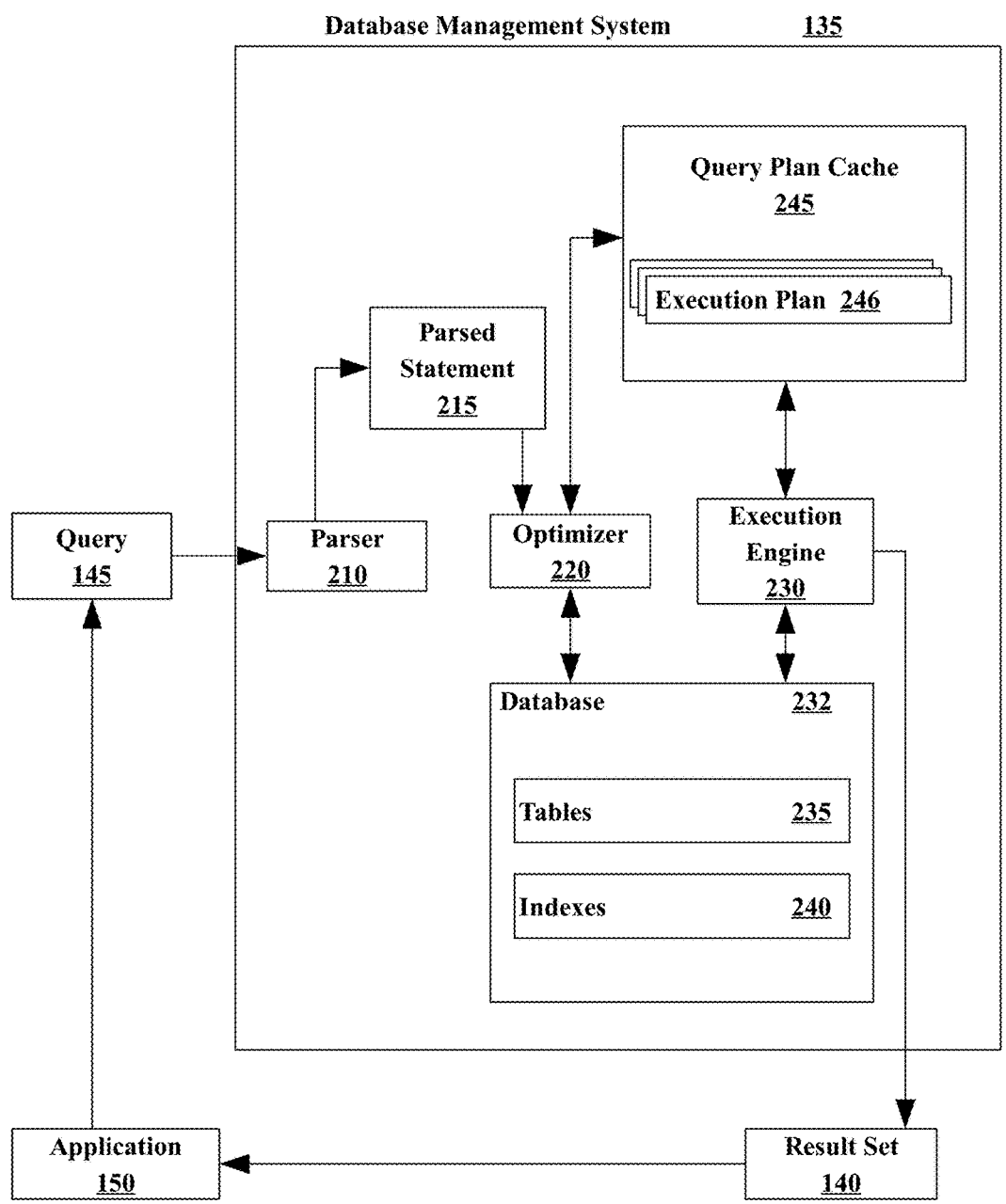
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

As mentioned herein, the optimizer 220 creates the query access plan. The optimizer 220 may be implemented as computer program instructions that optimize the access plan in dependence upon database management statistics. Database statistics may reveal, for example, that there are only two identification values in a transactions table—so that it is an optimization, that is, more efficient, to scan the transactions table rather than using an index. Alternatively, database statistics may reveal that there are many transaction records with only a few transaction records for each identification value—so that it is an optimization, that is, more efficient, to access the transaction records by an index.

Figure 3:
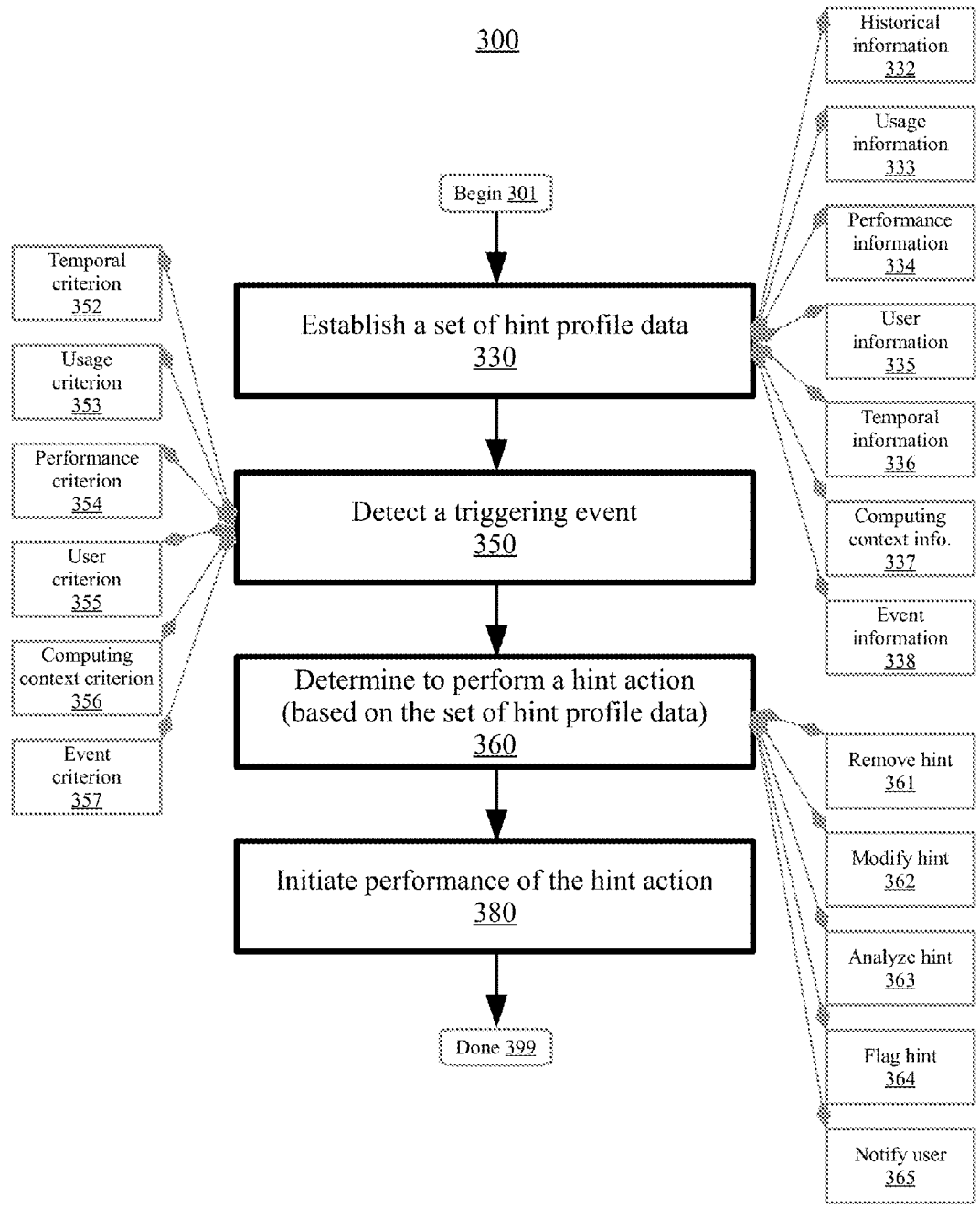
FIG. 3 is a flowchart illustrating a method for query hint management according to embodiments.

FIG. 3 is a flowchart illustrating a method 300 of query hint management according to embodiments. Hints are supported by many databases including those which are key-value store or document-based. Database users/administrators can tailor queries in ways the user/administrator desires by inputting hints into their production environments (e.g., controlled by the user/administrator). Query hint management, as described herein, may allow a database management system to manage, using a set of hint profile data, a life-cycle of a hint without manual intervention. Method 300 may begin at block 301.

In embodiments, the hint includes a selection of one or more hints from a group. The group can include a table scan (e.g., no index), an index selection/choice (e.g., which index), an index criteria/implementation (e.g., bitmap, probe, scan), a join order (e.g., of tables), a join criteria/implementation (e.g., nested loop, hash join, star join, merge join), a statistic (e.g., column statistics, frequent values list, histogram, cardinality, index statistics, table statistics, system statistics), a grouping criteria/implementation (e.g., index grouping, hash grouping, sort grouping), a sorting/ordering criteria/implementation (e.g., index sort, temporary table sort), a parallelism criteria, a fix-level criteria, a database code level (e.g., version, fix, fixpack level, database engine), an optimization goal (e.g., allio firstio), a fair memory share (e.g., a fair RAM share in megabytes per thread or per query), live data (e.g., insensitive, asensitive, sensitive), a processing intensive goal (e.g., processor versus input-output intensive goal), a parameter marker implementation, or a materialization goal (e.g., subquery, materialized query table, derived table). Various implementations of the hint can include using a cost ratio between indexes, for example, in each query plan. For instance, if producing an index using the hint in a first query costs twice as much as producing an index without using the hint (or using a different hint) in a second query, the second query may be evaluated to be a better option (when other aspects are equivalent).

At block 330, with respect to a hint for a query, a set of hint profile data is established. Establishing can include creating, generating, structuring, constructing, forming, organizing, saving, or storing. For example, the set of hint profile data may be established/saved/stored (e.g., as meta-data) in the query (e.g., as an SQL comment), in a catalog table, in an application, in a central repository, in another data structure on the system, etc. The set of hint profile data may include meta-data associated with or about the hint/query. When a hint is created/updated, the set of hint profile data may be established (e.g., created/updated). The establishment may occur automatically (e.g., in real-time) without user intervention, or can be related to a notification to a user/administrator. Accordingly, the SQL may be recompiled to capture the update.

In embodiments, the set of hint profile data can have one or more sets of information. The set of hint profile data may include a set of historical information which indicates a set of prior occurrences (e.g., existing hints, previous hints, deleted hints, reasons/rationales for hints, time-based information of additions/modifications, errors related to hints/queries, statistics for hints/queries) at block 332. The set of hint profile data can include a set of usage information which indicates a set of operational features (e.g., hardware performance for hints/queries, hardware efficiencies for hints/queries, virtual machine utilization for hints/queries, statistics for hints/queries, user/time-based/system information) at block 333. The set of hint profile data may have a set of performance information which indicates a set of run-time computations (e.g., expected run-times for queries, original run-times for queries, comparative run-time computations/statistics, performance/efficiencies for hints/queries, ratios for queries, statistics for hints/queries) at block 334.

In embodiments, the set of hint profile data may include a set of user information which indicates a set of user activities (e.g., a creator-user that created the hint, a modifier-user that modified the hint, a deleter-user that deleted the hint, a utilizer-user that utilized the hint, a disabler-user that disabled the hint, a frequent-user factor) at block 335. The set of hint profile data can include a set of temporal information which indicates a set of event-times (e.g., when hints were used, when hints were not used, when queries were initiated, when queries were completed, how long it took to run queries, when errors occurred, when hints expired, when hints were created, when hints were deleted, when hints were modified, when the validity/usefulness of a hint came into question, on-peak/off-peak timing) at block 336. The set of hint profile data may have a set of computing context information which indicates a set of computing factors (e.g., a computing environment, a batch/ALLIO environment, an interactive/FirstIO environment, a computing asset version/release/fix-level, a software/application/program, computing hardware such as processor/memory, network availability/bandwidth, a list/database of systems that have or have not been updated, a program code update or update schedule) at block 337. The set of hint profile data can have a set of event information which indicates a set of state-conditions (e.g., a triggering event, a computing asset version/release change, a query performance change exceeding a threshold, a query plan change or change request, a computing environment change, a hint end/expiration date, a release/hardware upgrade, a count of query executions with respect to a threshold, errors encountered, SQL error return codes, error message and offset from application) at block 338.

At block 350, the database management system detects a triggering event. Detecting can include receiving (e.g., from a user, from an application), sensing (e.g., in a multidimensional array, in an application), observing (e.g., based on usage/utilization). The triggering event may include achieving a temporal criterion (e.g., a time-to-live, an expiration date/time for a hint/query, an on-peak/off-peak period, a usage time, a hint-reevaluation date/time, an original run-time with respect to an actual run-time, an expected run-time with respect to an actual run-time) at block 352. The triggering event can include achieving a usage criterion (e.g., a count of query executions with respect to a threshold, a type-of-query utilization, execution/non-execution with respect to a specific database, a computing hardware resource exceeding a threshold, an application/environment hint/query utilization quota) at block 353. The triggering event may include achieving a performance criterion (e.g., statistics for hints/queries, a statistical benefit calculation, a comparison of the query with and without the hint, a processing time exceeding a threshold, a computing hardware performance statistic, an error rate, expected run-times for queries, original run-times for queries, comparative run-time computations/statistics, performance/efficiencies for hints/queries, ratios for queries) at block 354.

In embodiments, the triggering event can include achieving a user criterion (e.g., a creator-user that created the hint, a modifier-user that modified the hint, a deleter-user that deleted the hint, a utilizer-user that utilized the hint, a disabler-user that disabled the hint, a frequent-user factor) at block 355. The triggering event may include achieving a computing context criterion (e.g., a computing environment, a batch/ALLIO environment, an interactive/FirstIO environment, a computing asset version/release/fix-level, a software/application/program, computing hardware, network availability/bandwidth, a list/database of systems that have or have not been updated, a program code update or update schedule) at block 356. The triggering event can include achieving an event criterion (e.g., a threshold number of errors, a percentage of queries processed with/without hints, a computing asset version/release change, a query performance change exceeding a threshold, a query plan change or change request, a computing environment change, a hint end/expiration date, a release/hardware upgrade, a count of query executions with respect to a threshold, errors encountered, SQL error return codes) at block 357.

At block 360, based on the set of hint profile data, the database management system determines/resolves/computes to perform/execute/carry-out a hint action in response to the triggering event. For example, elements of the set of hint profile data may be compared/evaluated with respect to an associated threshold element (e.g., hardware resource utilization such as processor running at 85% with a threshold of 80%). When the element exceeds the associated threshold element, the database management system determines to perform the hint action. In other examples, the hint action is performed when the associated threshold element exceeds the element (e.g., version/release number such as the current threshold release is 3.1 and the release assumed by the hint/query is 1.0).

In embodiments, the hint action may include removing the hint (e.g., taking the hint out of the query, disabling the hint from usage by the query) at block 361. The hint action can include modifying the hint (e.g., altering the hint to better reflect the contents of the set of hint profile data, altering the hint for a current/new/expected usage, changing the hint for a different software version, a different hint for a different environment, preventing usage of the hint in certain predefined configurations) at block 362. The hint action may include analyzing the hint (e.g., extracting/examining/evaluating/inspecting/classifying/categorizing the hint without or with respect to other hints/queries, producing a report of hints such as those which are configured to expire within a threshold period of time) at block 363.

In embodiments, the hint action can include flagging the hint (e.g., for a user/administrator to analyze it at a later time, for the database management system to analyze at a later or less-burdensome time without manual intervention, identifying that the hint has significant positive impacts relative to the query without the hint, noting that the database the hint refers to is set to expire) at block 364. The hint action may include notifying a user (e.g., sending an e-mail or instant message, popping-up a dialog box, highlighting with a distinct color the query or query plan, presenting benefits/burdens of the hint, displaying a history of the hint, providing a hint reply list of actions such as honor the hint, reevaluate the hint, cancel the hint, or override the hint with respect to one or more particular jobs) at block 365.

At block 380, performance of the hint action is initiated. Initiating performance can include starting execution, beginning to carry-out a process, etc. The hint action may be fully performed/executed/carried-out. For example, the hint action can include modifying the hint to indicate the query to use a first query access plan instead of a second query access plan. Without modification, the query is indicated by the hint to use the second query access plan (e.g., thus using the first query access plan has expected performance/efficiency benefits). In particular, a first index may be used to produce a valid results-set instead of a second index. Various of possibilities are contemplated.

To illustrate, because structured query language (SQL) is declarative, there are typically multiple different ways to execute a given query (e.g., query plans) and each of those ways yields a different performance (e.g., while arriving at the same results). A query plan can include an ordered sequence of steps used to access or modify information in SQL based data systems. A typical query optimizer considers candidate query plans for a given query and determines which of those query plans will be efficient (e.g., lesser amount of latency). The query plan may be processed for storage (e.g., in a data store) or presentation (e.g., via a display). In embodiments, processing the query plan includes providing a valid results-set. Providing the valid results-set can include routing the valid results-set to the originator, processing an output with respect to the valid results-set, returning the valid results-set to storage, or displaying at least a portion of a valid results-set (e.g., to a user).

Method 300 concludes at block 399. Aspects of method 300 may provide performance or efficiency benefits with respect to query hint management. For example, aspects of method 300 may include positive impacts on resource usage (e.g., memory) or speed (e.g., processing) by using a hint action. Altogether, performance or efficiency benefits related to hint management for future processing of queries may occur (e.g., flexibility, responsiveness, productivity).

Figure 4:
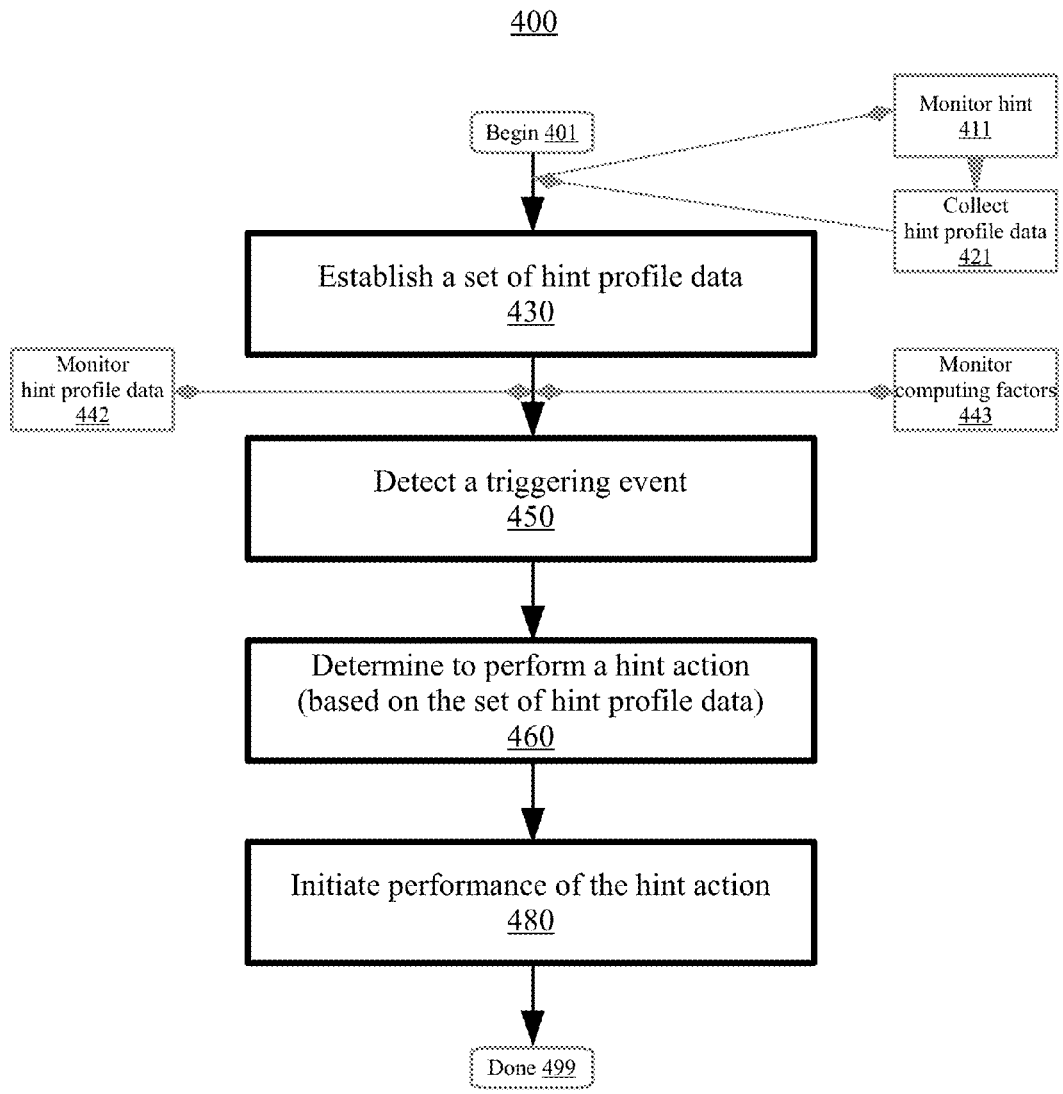
FIG. 4 is a flowchart illustrating a method for query hint management according to embodiments.

FIG. 4 is a flowchart illustrating a method 400 of query hint management according to embodiments. Query hint management, as described herein, may allow a database management system to manage, using a set of hint profile data, a life-cycle of a hint without manual intervention. Aspects of method 400 may be similar to or the same as method 300, and elements/features herein can be utilized interchangeably (e.g., with respect to the database management system). Method 400 may begin at block 401.

In embodiments, the database management system monitors the hint for the query to collect the set of hint profile data at block 411. Monitoring the hint can include tracking usage of the hint. Various daemons (e.g., which may run in the background) may be utilized/formulated to track the hint (e.g., by probing queries having the hint). The set of hint profile data may be collected at block 421 (e.g., to establish the set of hint profile data in a data store/structure). Collecting can include accumulating, acquiring, aggregating, capturing, gathering, obtaining, saving, or storing. The collecting can occur in an on-going (e.g., real-time, streamlined) basis or periodically (e.g., once per day). At block 430, with respect to a hint for a query, a set of hint profile data is established.

In embodiments, the database management system monitors the set of hint profile data at block 442 to ascertain whether the set of hint profile data indicates achievement of the triggering event. In embodiments, by the database management system monitors a set of computing factors (e.g., a computing environment, a batch/ALLIO environment, an interactive/FirstIO environment, a computing asset version/release/fix-level, a software/application/program, computing hardware such as processor/memory, network availability/bandwidth, a list/database of systems that have or have not been updated, a program code update or update schedule) at block 443 to ascertain whether the set of computing factors indicates achievement of the triggering event. Monitoring can include observing and analyzing. In certain embodiments, observing and analyzing can include aspects which detect/receive an element and process/identify the element that was detected/received. For instance, observing can include querying (e.g., asking a question), searching (e.g., exploring for a reason), obtaining (e.g., recording a collection), probing (e.g., checking a property), scanning (e.g., reviewing a sample), or tracking (e.g., following a characteristic). For instance, analyzing can include extracting (e.g., creating a derivation), examining (e.g., performing an inspection), dissecting (e.g., scrutinizing an attribute), parsing (e.g., deciphering a construct), comparing (e.g., relating an assessment), or classifying (e.g., assigning a designation). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided) for further use.

At block 450, the database management system detects a triggering event. At block 460, based on the set of hint profile data, the database management system determines to perform a hint action in response to the triggering event. At block 480, performance of the hint action is initiated.

Method 400 concludes at block 499. Aspects of method 400 may provide performance or efficiency benefits with respect to query hint management. For example, aspects of method 400 may include positive impacts on resource usage (e.g., memory) or speed (e.g., processing) by monitoring hints, hint profile data, or computing factors. Altogether, performance or efficiency benefits related to using a hint action may occur (e.g., flexibility, responsiveness, productivity).

Figure 5:
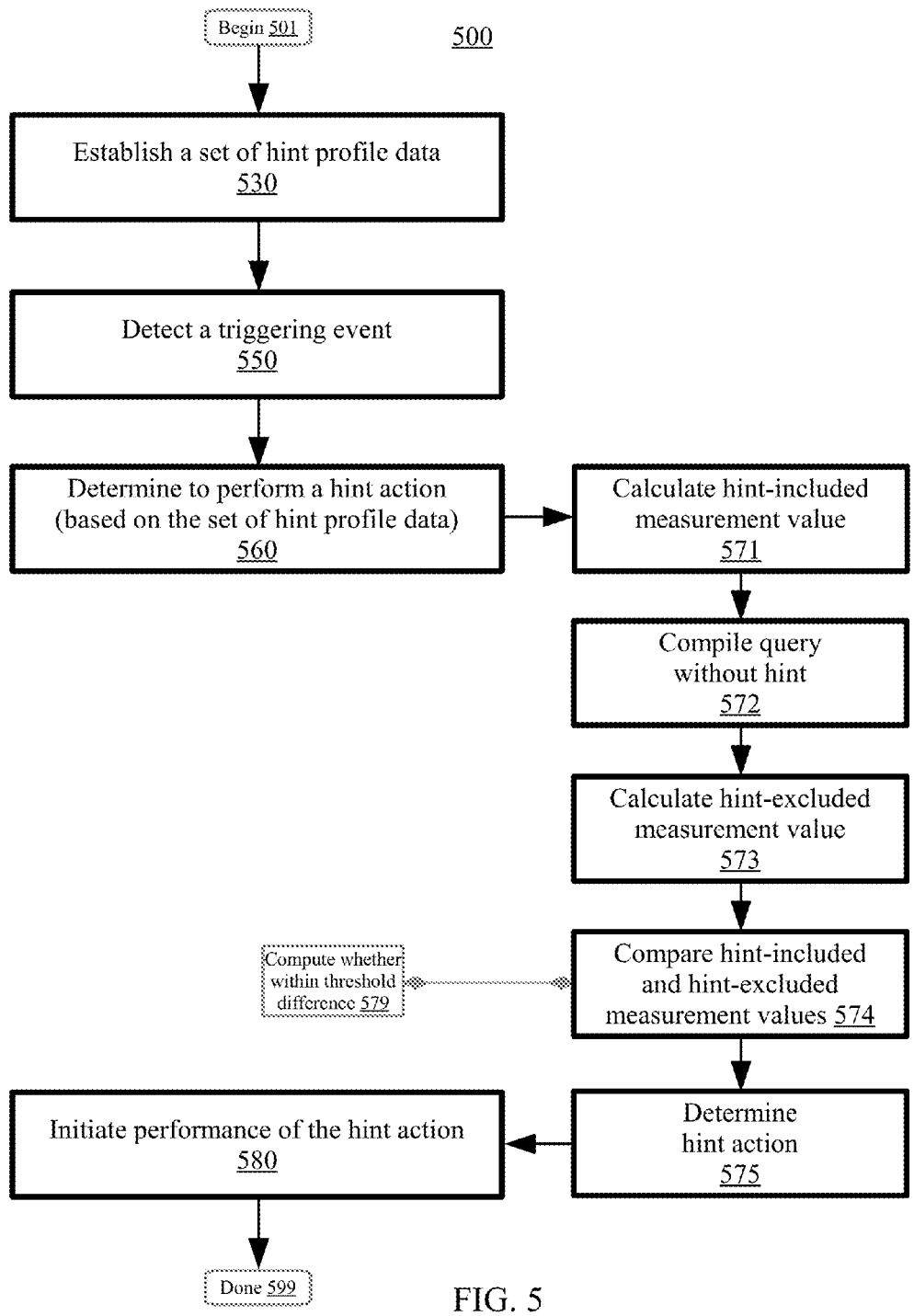
FIG. 5 is a flowchart illustrating a method for query hint management according to embodiments.

FIG. 5 is a flowchart illustrating a method 500 of query hint management according to embodiments. Query hint management, as described herein, may allow a database management system to manage, using a set of hint profile data, a life-cycle of a hint without manual intervention. Aspects of method 500 may be similar to or the same as methods 300 and 400, and elements/features herein can be utilized interchangeably (e.g., with respect to the database management system). Method 500 may begin at block 501.

At block 530, with respect to a hint for a query, a set of hint profile data is established. At block 550, the database management system detects a triggering event. At block 560, based on the set of hint profile data, the database management system determines to perform a hint action in response to the triggering event.

In response to an execution of the query with the hint, a hint-included measurement value may be calculated at block 571. Execution of the query may occur before, after, or as the triggering event. The hint-included measurement value may have a statistical value, ratio, or other numerical value which indicates a performance, efficiency, or output of executing the query with the hint (e.g., processor usage, memory usage, bandwidth usage, run-time, energy usage, achieving desired output). The query without the hint can be compiled at block 572. In response to an execution of the query without the hint, a hint-excluded measurement value may be calculated at block 573. The hint-excluded measurement value may have a statistical value, ratio, or other numerical value which indicates a performance, efficiency, or output of executing the query without the hint.

The hint-included performance measurement value and the hint-excluded performance measurement value may be compared at block 574 (e.g., to determine if one is preferred over the other and possibly how much better/preferred). In certain embodiments, whether the hint-included performance measurement value and the hint-excluded performance measurement value are within a threshold difference value (e.g., within 10%, within 5 units, within 2 seconds of processing time) can be computed at block 579. Based on the comparing, the hint action can be determined at block 575. For example, the hint may be removed if the hint-excluded performance measurement value is computed twice as fast as the hint-included performance measurement value (e.g., with no other significant downsides). As another example, the hint may be flagged if the hint-excluded performance measurement value is computed slightly faster than the hint-included performance measurement value (e.g., allowing a user/administrator to later look at the flagged hint to make a decision without having the database management system automatically changing elements that may produce other unexpected challenges). Other possibilities including those using elements described herein using various combinations of comparison techniques and hint actions are considered. At block 580, performance of the hint action is initiated.

Method 500 concludes at block 599. Aspects of method 500 may provide performance or efficiency benefits with respect to query hint management. For example, aspects of method 500 may include positive impacts on resource usage (e.g., memory) or speed (e.g., processing) by selecting which queries to use or not use hints in. Altogether, performance or efficiency benefits related to using a hint action may occur (e.g., flexibility, responsiveness, productivity).

Figure 6:
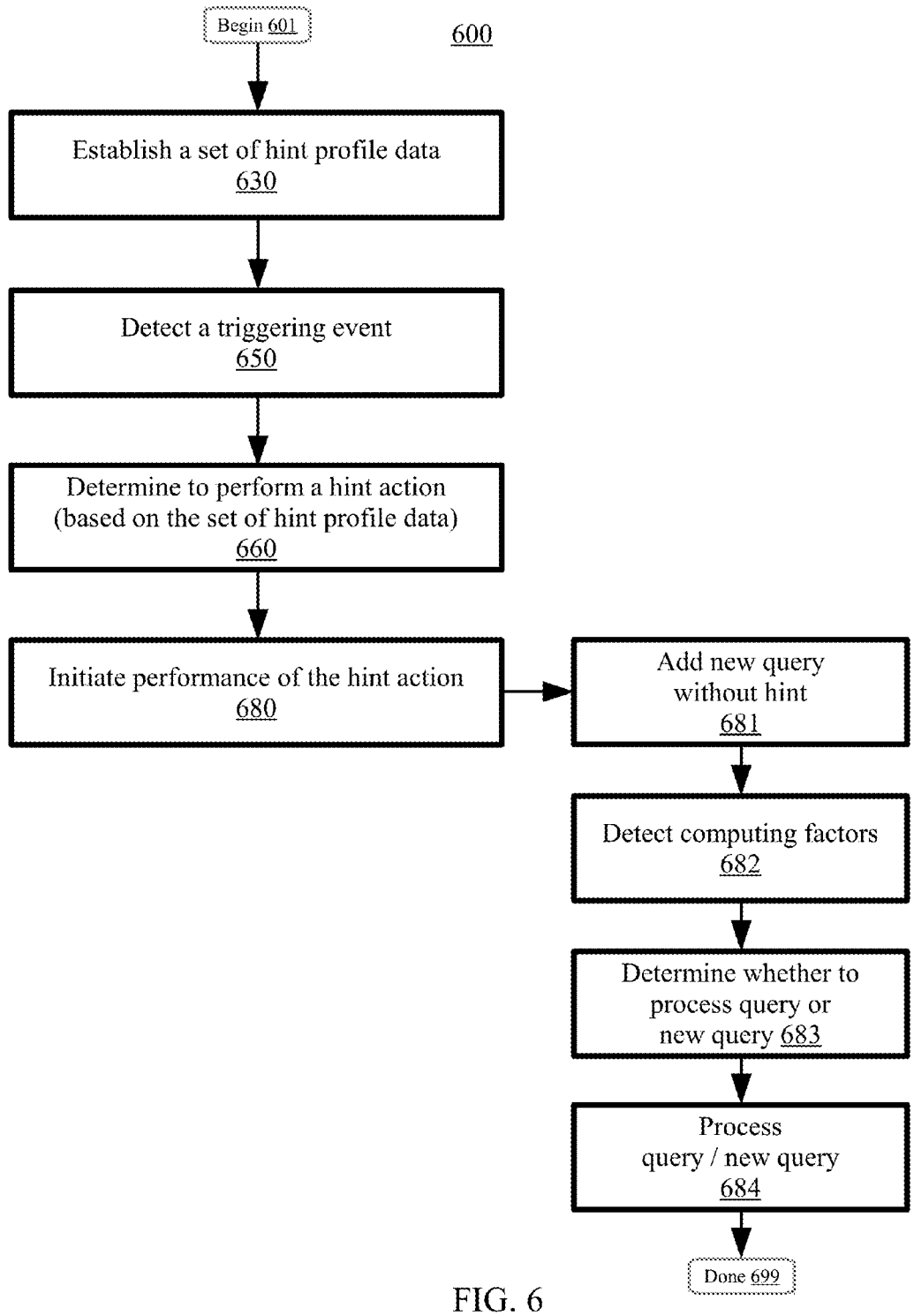
FIG. 6 is a flowchart illustrating a method for query hint management according to embodiments.

FIG. 6 is a flowchart illustrating a method 600 of query hint management according to embodiments. Query hint management, as described herein, may allow a database management system to manage, using a set of hint profile data, a life-cycle of a hint without manual intervention. Aspects of method 600 may be similar to or the same as methods 300, 400, and 500, and elements/features herein can be utilized interchangeably (e.g., with respect to the database management system). Method 600 may begin at block 601.

At block 630, with respect to a hint for a query, a set of hint profile data is established. At block 650, the database management system detects a triggering event. At block 660, based on the set of hint profile data, the database management system determines to perform a hint action in response to the triggering event. At block 680, performance of the hint action is initiated.

In embodiments, the hint action includes adding a new query without the hint at block 681. A set of computing factors (e.g., a computing environment, a batch/ALLIO environment, an interactive/FirstIO environment, a computing asset version/release/fix-level, a software/application/program, computing hardware such as processor/memory, network availability/bandwidth, a list/database of systems that have or have not been updated, a program code update or update schedule) is detected at block 682. Based on the set of computing factors (e.g., by comparing corresponding computing factors for the queries and choosing/selecting based on performance/efficiency), it is determined whether to process the query or the new query at block 683. Based on the determining, at least one of the query or the new query is processed/executed/run at block 684.

Method 600 concludes at block 699. Aspects of method 600 may provide performance or efficiency benefits with respect to query hint management. For example, aspects of method 600 may include positive impacts on resource usage (e.g., memory) or speed (e.g., processing) by using a set of computing factors to determine whether to process the query or the new query. Altogether, performance or efficiency benefits related to using a hint action may occur (e.g., flexibility, responsiveness, productivity).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system of query hint management in a database management system, the system comprising:
   a memory having a set of computer readable computer instructions; and
   a processor for executing the set of computer readable instructions, the set of computer readable instructions including instructions for causing the processor to perform at least the following operations:
     establishing a set of hint profile data with respect to a hint for a query,
     detecting, by the database management system, a triggering event,
     determining, by the database management system based on the set of hint profile data, to perform a hint action in response to the triggering event,
     initiating performance of the hint action, with the hint action including adding a new query without the hint,
     detecting a set of computing factors,
     determining, based on the detected set of computing factors, whether to process the query or the new query, and
     processing, based on the determination, at least one of the query or the new query.

* * * * *